US010889221B2

(12) United States Patent
Takei et al.

(10) Patent No.: US 10,889,221 B2
(45) Date of Patent: Jan. 12, 2021

(54) SOUND PICKUP DEVICE

(71) Applicant: CLARION CO., LTD., Saitama (JP)

(72) Inventors: Shingo Takei, Saitama (JP); Naoki Takada, Saitama (JP)

(73) Assignee: CLARION CO., LTD., Saitama (JP)

( * ) Notice: Subject to any disclaimer, the term of this patent is extended or adjusted under 35 U.S.C. 154(b) by 244 days.

(21) Appl. No.: 16/303,787

(22) PCT Filed: Jun. 23, 2017

(86) PCT No.: PCT/JP2017/023273
§ 371 (c)(1),
(2) Date: Nov. 21, 2018

(87) PCT Pub. No.: WO2018/003714
PCT Pub. Date: Jan. 4, 2018

(65) Prior Publication Data
US 2020/0317102 A1    Oct. 8, 2020

(30) Foreign Application Priority Data

Jun. 29, 2016    (JP) .................................. 2016-129209

(51) Int. Cl.
*B60N 2/80*    (2018.01)
*B60N 2/879*    (2018.01)
(Continued)

(52) U.S. Cl.
CPC .............. *B60N 2/879* (2018.02); *A47C 7/727* (2018.08); *B60N 2/64* (2013.01); *B60R 11/0223* (2013.01);
(Continued)

(58) Field of Classification Search
CPC ....... B60N 2/879; B60N 2/64; B60R 11/0223; B60R 11/0247; B60R 2011/0017; B60R 2011/0043
(Continued)

(56) References Cited

U.S. PATENT DOCUMENTS 9,975,459 B2 *   5/2018   Takada ................... B60N 2/879
2003/0081795 A1 * 5/2003  Hirao ..................... B60N 2/879
                                                   381/86
(Continued)

FOREIGN PATENT DOCUMENTS

JP    H5-273987 A    10/1993
JP    07160275 A     6/1995
(Continued)

OTHER PUBLICATIONS

International Search Report for corresponding International Patent Application No. PCT/JP2017/023273 dated Jul. 21, 2017.
(Continued)

*Primary Examiner* — Mark R Wendell
(74) *Attorney, Agent, or Firm* — IP Business Solutions, LLC

(57) ABSTRACT

There is provided a sound pickup device capable of satisfactorily picking up sound from a seated person side.
A sound pickup device 1 includes a headrest 11 which is provided with an opening 29 on a seating surface 11*a* side, and has a recess 25 formed in the opening 29, and two or more sound pickup means, a first sound pickup means 31 and a second sound pickup means 32 are disposed in the recess 25 of the headrest 11, and the first sound pickup means 31 and the second sound pickup means 32 are disposed so that distances to the first sound pickup means 31 and the second sound pickup means 32 from a portion,
(Continued)

closest to the seating surface 11a, of the opening 29 of the headrest 11 are different from each other.

7 Claims, 14 Drawing Sheets

(51) Int. Cl.
| | | |
|---|---|---|
| *A47C 7/72* | (2006.01) | |
| *B60N 2/64* | (2006.01) | |
| *B60R 11/02* | (2006.01) | |
| *B60R 11/00* | (2006.01) | |

(52) U.S. Cl.
CPC ... *B60R 11/0247* (2013.01); *B60R 2011/0017* (2013.01); *B60R 2011/0043* (2013.01)

(58) Field of Classification Search
USPC ........................................... 297/217.3
See application file for complete search history.

(56) References Cited

U.S. PATENT DOCUMENTS

| | | | |
|---|---|---|---|
| 2003/0142842 A1* | 7/2003 | Arai .................. | A47C 7/72 381/300 |
| 2005/0190935 A1* | 9/2005 | Sakamoto ............... | H04R 5/02 381/302 |
| 2016/0093283 A1 | 3/2016 | Kano | |
| 2016/0100250 A1* | 4/2016 | Baskin .................. | B60N 2/879 297/217.4 |
| 2016/0257227 A1* | 9/2016 | Takada ................ | B60R 11/0217 |
| 2017/0106775 A1* | 4/2017 | Takada .................. | B60N 2/809 |
| 2019/0118688 A1* | 4/2019 | Fujikake ............. | B60R 11/0217 |

FOREIGN PATENT DOCUMENTS

| | | |
|---|---|---|
| JP | H11-219193 A | 8/1999 |
| JP | 2004083004 A | 3/2004 |
| JP | 2005118248 A | 5/2005 |
| JP | 2009255735 A | 11/2009 |
| JP | 2016068714 A | 5/2016 |
| WO | 2015076120 A1 | 5/2015 |

OTHER PUBLICATIONS

Written Opinion for corresponding International Patent Application No. PCT/JP2017/023273 dated Jul. 21, 2017.
International Preliminary Report on Patentability dated Jan. 10, 2019 for the corresponding PCT/JP2017/023273.
Written Opinion of the International Searching Authority issued for the corresponding PCT/JP2017/023273.
Office Action issued for the counterpart Japanese Patent Application No. 20016-129209 dated Dec. 3, 2019.
Extended European Search Report for the counterpart European Patent Application No. 17820071.3 dated Jan. 28, 2020.

* cited by examiner

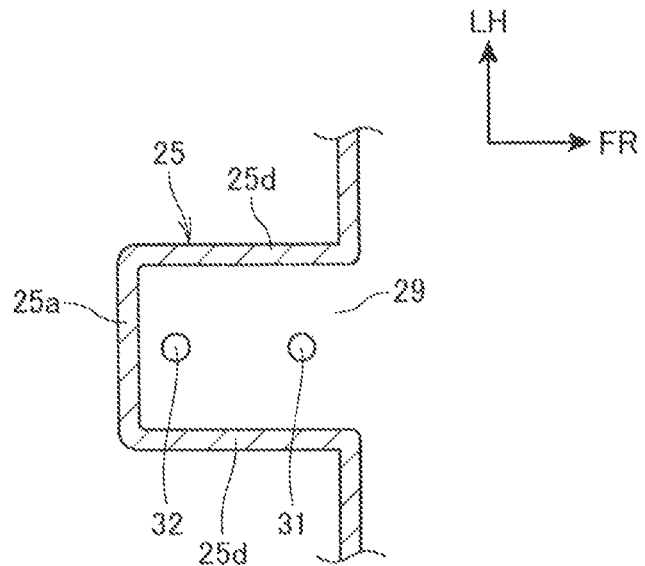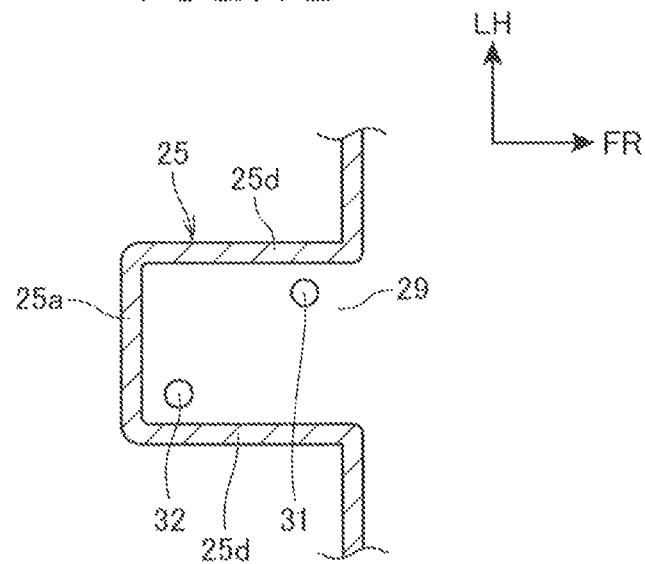

SOUND PICKUP DEVICE

TECHNICAL FIELD

The present invention relates to a sound pickup device.

BACKGROUND ART

There has been known a sound pickup device in which a microphone as a sound pickup means is incorporated into a headrest of a seat in which a seated person is seated, to be able to pick up sound from the seated person side (for example, see Patent Literature 1).

CITED LIST

Patent Literature

[Patent Literature 1]
Japanese Patent Laid-Open No. 2005-118248

SUMMARY OF INVENTION

Technical Problem

In the sound pickup device, it is desirable that sound from the seated person side can be satisfactorily picked up.

The present invention has been made in view of the above-described circumstances, and an object of the present invention is to provide a sound pickup device capable of satisfactorily picking up sound from a seated person side.

Solution to Problem

All of the contents of Japanese Patent Application No. 2016-129209 filed on Jun. 29, 2016 are incorporated in the specification.

In order to attain the above-described object, a sound pickup device of an aspect of the present invention includes a headrest which is provided with an opening on a seating surface side, and has a recess formed in the opening, and two or more sound pickup means, wherein a first sound pickup means and a second sound pickup means are disposed in the recess of the headrest, and the first sound pickup means and the second sound pickup means are disposed so that distances to the first sound pickup means and the second sound pickup means from a portion closest to the seating surface, of the opening of the headrest are different from each other.

In the sound pickup device of an aspect of the present invention, the first sound pickup means and the second sound pickup means each may be a nondirectional microphone.

In the sound pickup device of an aspect of the present invention, at least one of the first sound pickup means and the second sound pickup means may be disposed facing downward from an upper surface portion of the recess.

Furthermore, in the sound pickup device of an aspect of the present invention, when the first sound pickup means and the second sound pickup means are projected onto a plane being formed by the opening, the projections of the first sound pickup means and the second sound pickup means may be disposed to be located at positions different from each other.

In the sound pickup device of an aspect of the present invention, the headrest includes a core material, a cushion member which is configured to cover the core material, a skin which is configured to cover the cushion member, wherein the recess is formed in the core material, the cushion member is provided with an opening which communicates the recess with a rear surface side of the skin.

A sound pickup device of an aspect of the present invention includes a seat back which is provided with an opening on a seating surface side, and has a recess formed in the opening, and two or more sound pickup means, wherein a first sound pickup means and a second sound pickup means are disposed in the recess of the seat back, and the first sound pickup means and the second sound pickup means are disposed so that distances to the first sound pickup means and the second sound pickup means from a portion, closest to the seating surface, of the opening of the seat back are different from each other.

A sound pickup device of an aspect of the present invention includes a seat back, and a headrest which is connected to the seat back, wherein a recess being provided with an opening on a seating surface side is formed between the seat back and the headrest, the recess is formed by joining a recess on one side which is formed in one of the seat back and the headrest, and the other of the seat back and the headrest, and the sound pickup device further includes two or more sound pickup means, wherein a first sound pickup means and a second sound pickup means are disposed in the recess, and the first sound pickup means and the second sound pickup means are disposed so that distances to the first sound pickup means and the second sound pickup means from a portion, closest to the seating surface, of the opening are different from each other.

In the sound pickup device of an aspect of the present invention, one of the first sound pickup means and the second sound pickup means may be provided in the recess on one side, and the other of the first sound pickup means and the second sound pickup means may be provided in the other of the seat back and the headrest.

Advantageous Effects of Invention

In a sound pickup device of an aspect of the present invention, the sound pickup device includes a first sound pickup means and a second sound pickup means in an opening on a seating surface side, and the first sound pickup means and the second sound pickup means are disposed so that distances to the first sound pickup means and the second sound pickup means from a portion, closest to the seating surface, of the opening are different from each other. Thus, the first sound pickup means and the second sound pickup means are disposed at the distances from a sound source being different from each other in a direction toward the seating surface from a seated person as the sound source, thereby capable of detecting the sound from the sound source with a phase difference between the sound arriving at the first sound pickup means and the sound arriving at the second sound pickup means. Therefore, the sensitivity of the sound pickup means with respect to the sound from the seated person side can be emphasized by the directivity control of the sound using the phase difference, thereby capable of satisfactorily picking up the sound from the seated person side. Furthermore, the first pickup means and the second sound pickup means are disposed in the recess, thereby capable of preventing the sound arriving from a direction different from that of the seated person side from arriving at the first pickup means and the second sound pickup means, and satisfactorily picking up the sound from the seated person side.

BRIEF DESCRIPTION OF DRAWINGS

FIG. 7 is a cross-sectional view illustrating an example of arrangement variations in the width direction of the first sound pickup means and the second sound pickup means.

DESCRIPTION OF EMBODIMENTS

Hereinafter, embodiments of the present invention will be described with reference to the drawings.

First Embodiment

Figure 1:
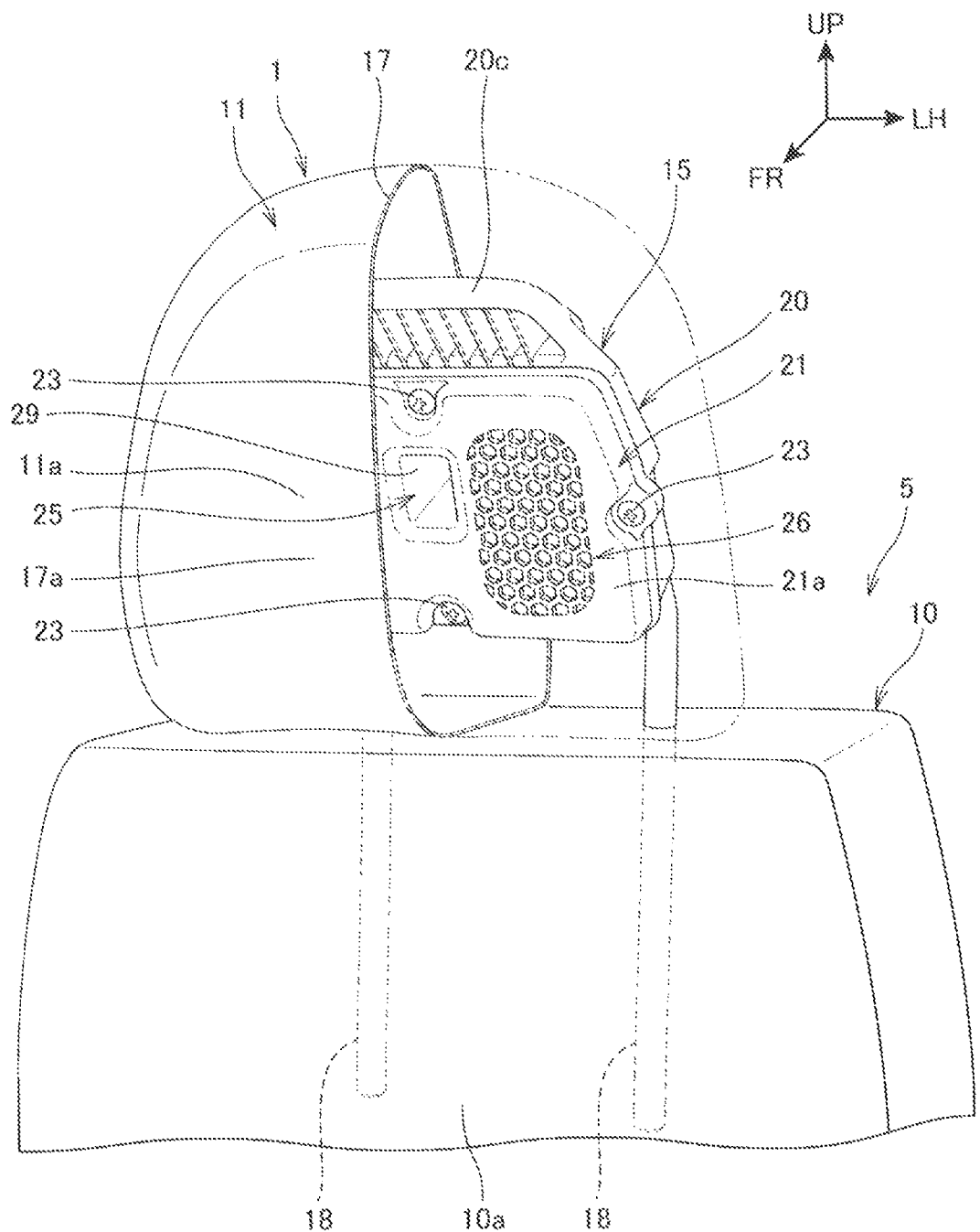
FIG. 1 is a perspective view illustrating a sound pickup device according to a first embodiment of the present invention.

FIG. 1 is a perspective view illustrating a sound pickup device 1 according to a first embodiment of the present invention. In FIG. 1, illustration of a cushion member 16 which will be described later is omitted, and a half of a skin 17 is indicated by an imaginary line.

The sound pickup device 1 is provided in a seat 5 for a passenger (seated person) that is disposed in a vehicle interior. Examples of the above-described vehicle interior include vehicle interiors of an automobile, a train, an airplane, and a ship. In the first embodiment, the sound pickup device 1 being provided in the seat 5, which is a front seat of an automobile and in which a driver is seated, is explained as an example.

Note that the sound pickup device 1 is applicable not only to a vehicle but also to furniture such as an office chair, and a sofa, which is used in an office or a house.

The seat 5 includes a seating portion (not illustrated) in which a seated person is seated, a seat back 10 which serves as a backrest extending upwardly from a rear end of the seating portion, and the sound pickup device 1 which is mounted on an upper end of the seat back 10.

The seat back 10 includes a seat back seating surface 10a which faces the back of the seated person and against which the back of the seated person can be leaned. The seat back seating surface 10a is a front surface of the seat back 10.

The sound pickup device 1 includes a headrest 11 with which a back of a head of the seated person can come into contact. The headrest 11 includes a headrest seating surface 11a (seating surface) which faces the back of the head of the seated person. The headrest seating surface 11a is a front surface of the sound pickup device 1.

In the description below, a direction toward the seated person side when viewed from the seat back seating surface 10a and the headrest seating surface 11a is referred to as a forward direction of the seat back 10 and the sound pickup device 1, and a left-right direction when viewed from the seated person facing frontward is referred to as a width direction (left-right direction) of the seat back 10 and the sound pickup device 1.

In the description below, in the drawing, reference sign UP denotes the upward direction, reference sign FR denotes the forward direction, and reference sign LH denotes the leftward direction.

Figure 2:
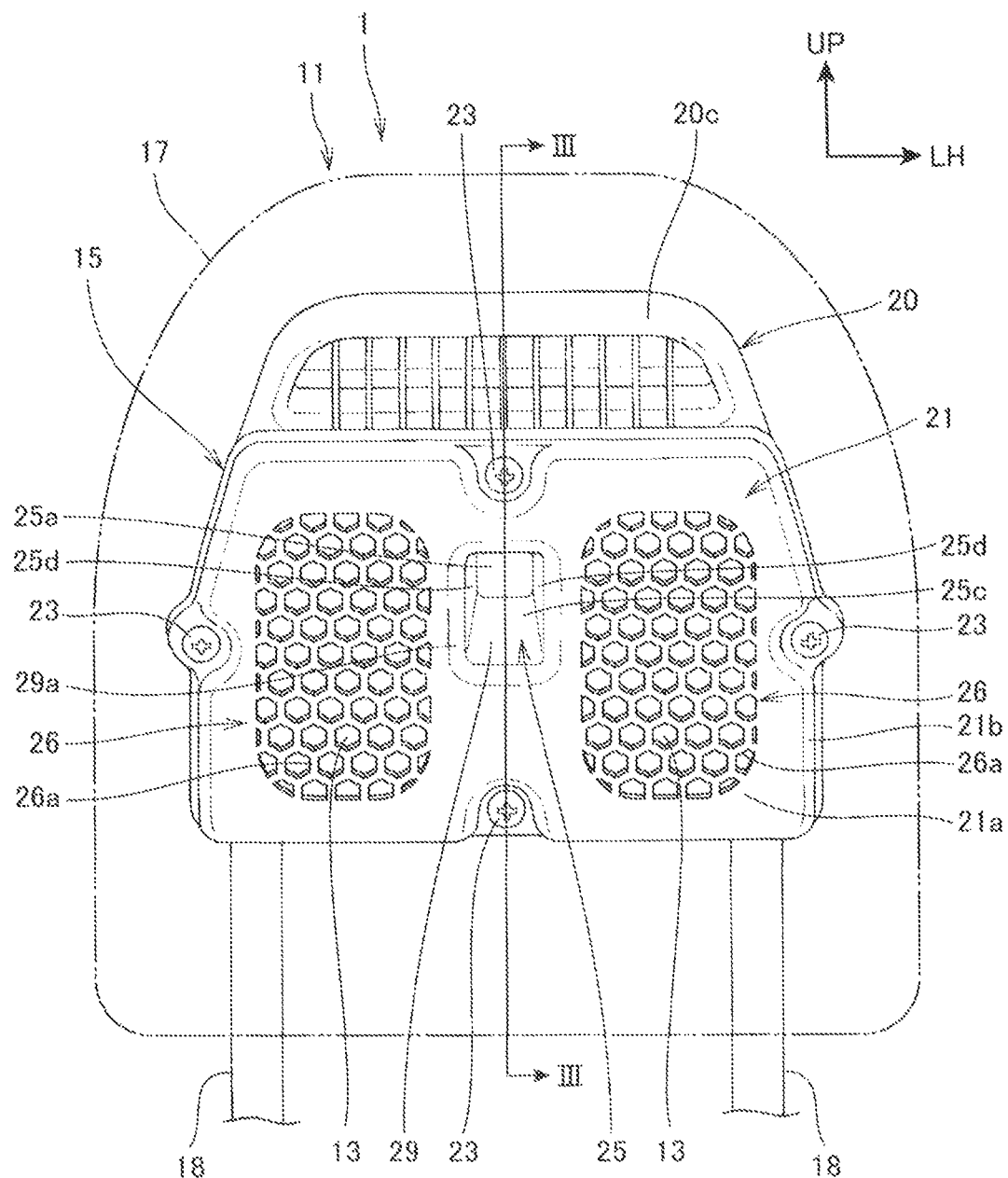
FIG. 2 is a front view of the sound pickup device as viewed from the front side.
Figure 3:
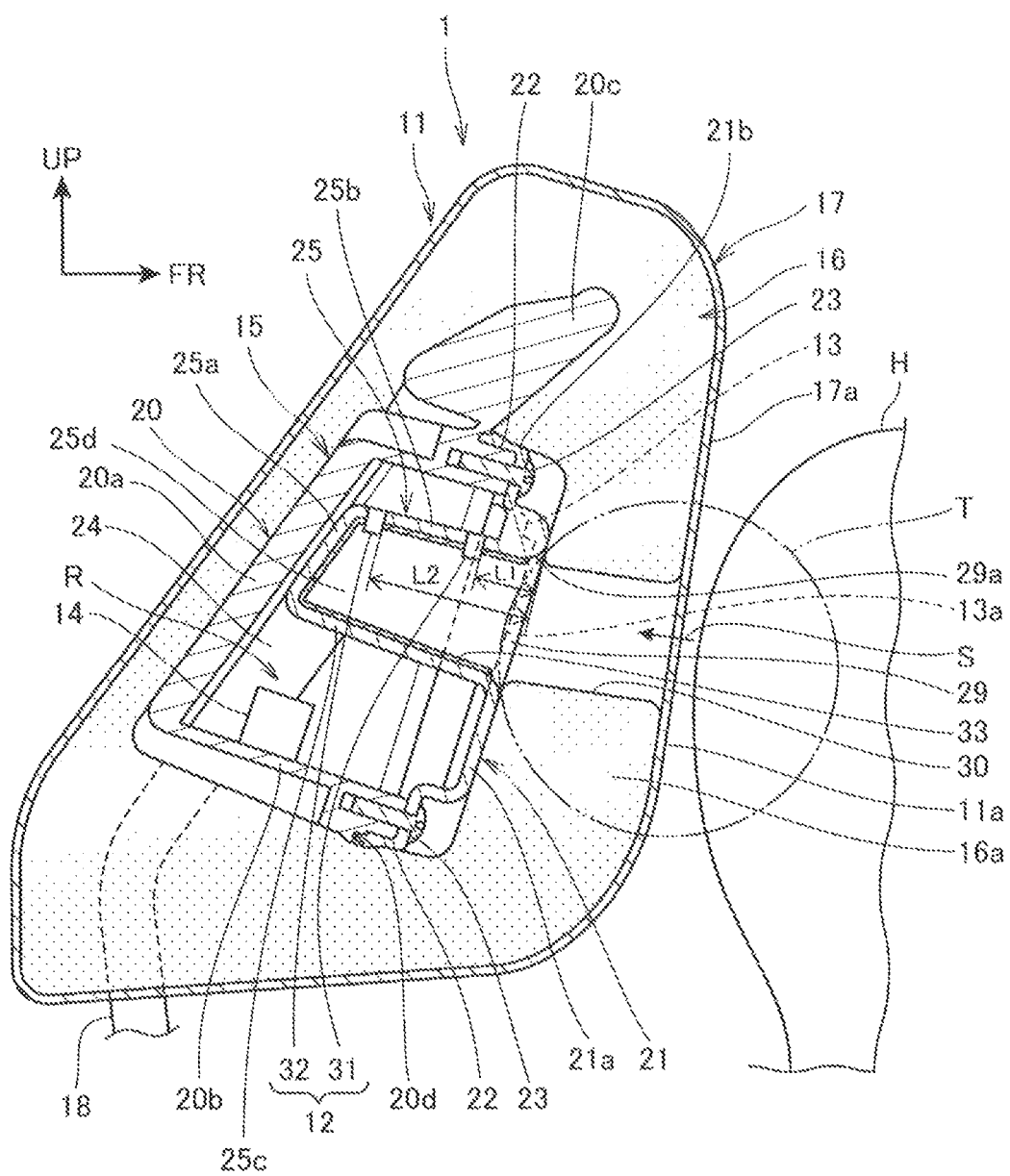
FIG. 3 is a cross-sectional view taken along line III-III of FIG. 2.

FIG. 2 is a front view of the sound pickup device 1 as viewed from the front side. FIG. 3 is a cross-sectional view taken along line III-III of FIG. 2. In FIG. 2, an external shape of the skin 17 which is described later is indicated by an imaginary line.

Referring to FIG. 1 to FIG. 3, the sound pickup device 1 includes the above-described headrest 11, a microphone array 12 (see FIG. 3) which serves as a sound pickup means for picking up the sound, a pair of left and right speakers 13, 13, a control unit 14 (see FIG. 3) which is electrically connected to the microphone array 12 and the speakers 13, 13, and controls the operations of the microphone array 12 and the speakers 13, 13.

The headrest 11 includes a core material 15 which serves as a skeleton of the sound pickup device 1, a cushion member 16 (see FIG. 3) which is configured to cover the core material 15 from its periphery, the skin 17 which is configured to cover the cushion member 16 from its periphery, and a pair of left and right headrest stays 18, 18 which extend downwardly from the core material 15.

The sound pickup device 1 includes a communication unit (not illustrated) which enables the sound pickup device 1 to cooperate with the other devices (not illustrated) such as a portable terminal through short-range radio communication. Examples of the above-described other devices include a cellular phone, a smart phone, and a tablet terminal. Examples of the above-described short-range radio communication include Bluetooth (a short-range radio communication standard: registered trademark). Note that the sound pickup device 1 and the above-described other devices can be connected by not only the short-range radio communication but also, for example, a wire.

In a state in which the sound pickup device 1 cooperates with the above-described other devices, the sound pickup device 1 outputs, from the speakers 13, 13, as sound, sound data of contents read out from the other devices, guidance sound data for guiding a vehicle to a destination, and the like. In the state in which the sound pickup device 1 cooperates with the above-described other devices the seated person can operate the other devices using, as a voice command, sound picked up by the microphone array 12 and make a call in a hand-free manner via the microphone array 12.

The sound pickup device 1 is fixed to the seat back 10 by inserting the rod-shaped headrest stays 18, 18 into respective holes in the upper surface of the seat back 10. The sound pickup device 1 is configured to be capable of changing a height position of attachment according to a physique or the like of the seated person by adjusting insertion depth of the headrest stays 18, 18 into the above-described holes. That is, the height position of the sound pickup device 1 is adjusted according to the seated person, thereby capable of easily picking up the sound by the microphone array 12 and enabling the seated person to easily listen to the sound of the speakers 13, 13.

The core material 15 includes a box-shaped case 20 which is opened in the front surface, and a front cover 21 which covers the front surface of the case 20. In a state in which the sound pickup device 1 is mounted on the seat back 10, the front cover 21 forming the front surface of the core material 15 is in a forward-inclined posture as illustrated in FIG. 3. The case 20 and the front cover 21 are resin molded products.

Figure 4:
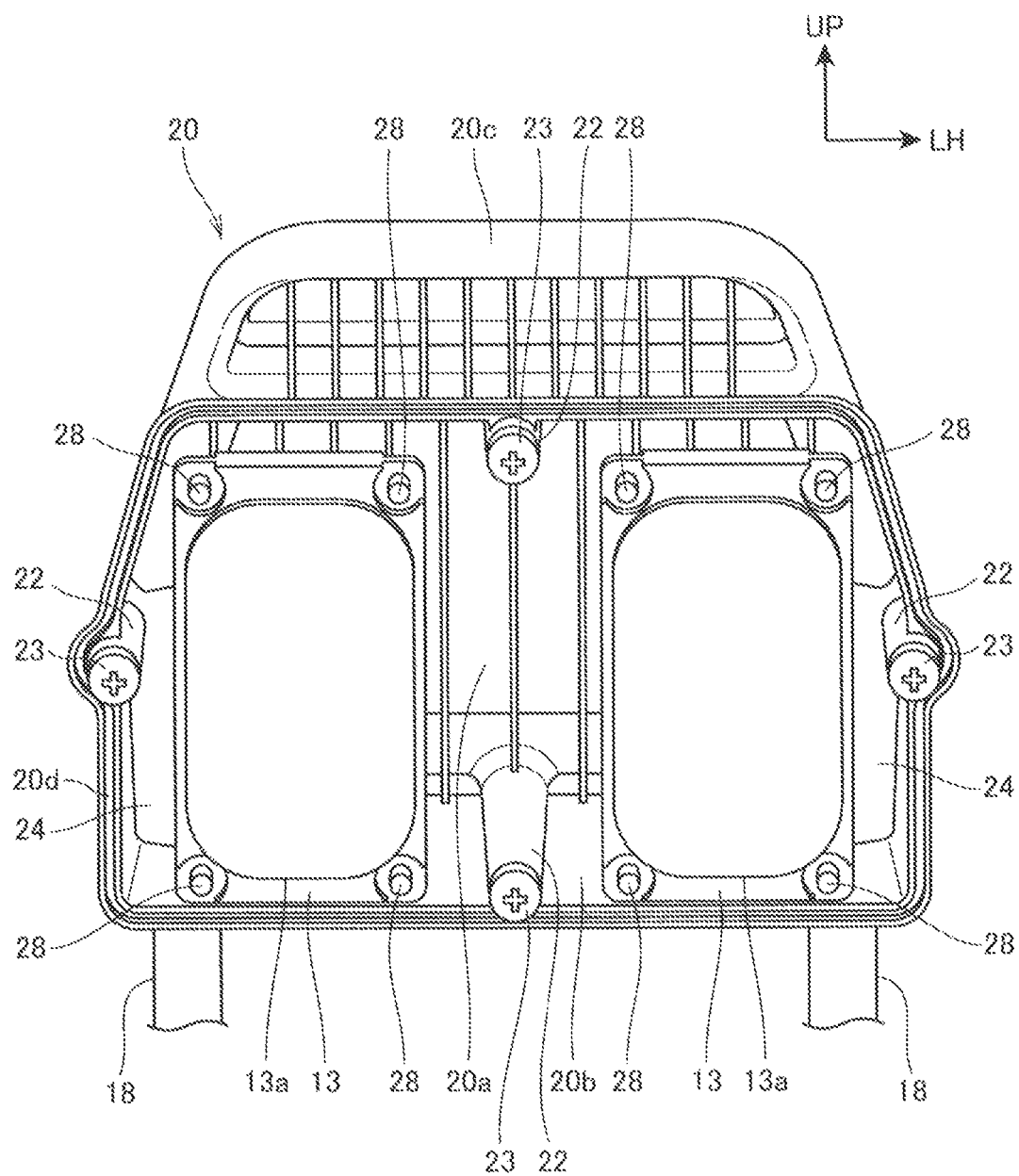
FIG. 4 is a diagram illustrating a case with a front cover removed, as viewed from the front side.

FIG. 4 is a diagram illustrating the case 20 with the front cover 21 removed, as viewed from the front side.

Referring to FIG. 1 to FIG. 4, the case 20 includes a substantially rectangular rear wall 20a, a peripheral wall portion 20b which extends forward from a peripheral edge of the rear wall 20a, and a plate-shaped upwardly extending portion 20c which extends upwardly from the upper surface of the peripheral wall portion 20b. The upwardly extending portion 20c is formed over the almost entire upper surface in the width direction of the peripheral wall portion 20b.

A joining portion 20d to which the front cover 21 is to be fitted is formed on the entire circumference of the front edge of the frame-shaped peripheral wall portion 20b in a front view.

A cylindrical boss portion 22 is formed on each of the upper, lower, left and right inner surfaces of the peripheral wall portion 20b. Each of cover fixing bolts 23 for fixing the front cover 21 to the case 20 is fastened to the boss portion 22.

The stay connecting portions 24, 24 are formed at both ends in the width direction in the inner surface of the rear wall 20a of the case 20, so that the upper ends of the headrest stays 18, 18 are inserted into and fixed to stay connecting portions 24, 24, respectively.

Figure 5:
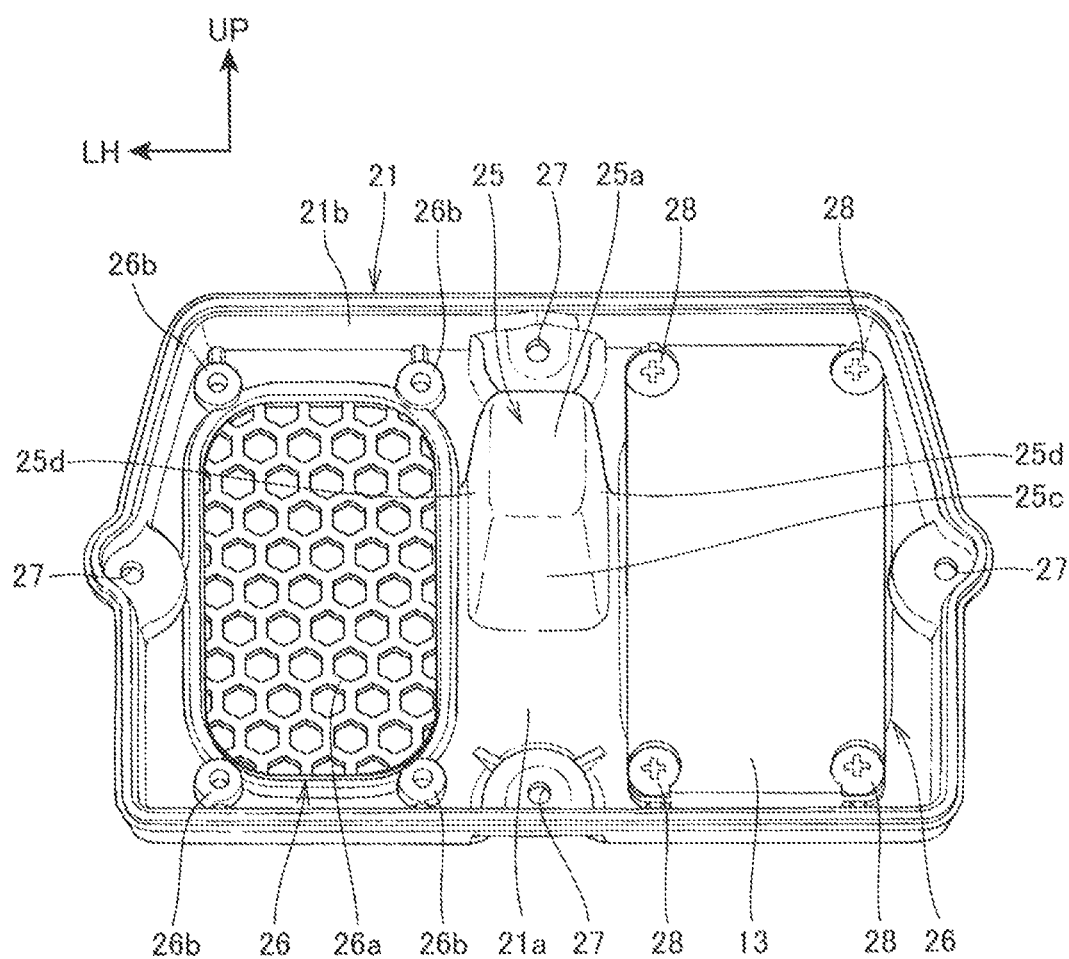
FIG. 5 is a diagram illustrating the front cover, as viewed from the rear side.

FIG. 5 is a diagram illustrating the front cover 21, as viewed from the rear side. Note that as to the speakers 13, 13, only a right-side one is illustrated in FIG. 5 to illustrate the attachment structure.

Referring to FIG. 1 to FIG. 5, the front cover 21 includes a front wall 21a which substantially faces the rear wall 20a of the case 20, and a cover peripheral wall portion 21b which extends rearward from a peripheral edge of the front wall 21a.

The front cover 21 includes a recess 25 which is provided at a center portion in the width direction of the front cover 21, and a pair of left and right speaker mounting portions 26, 26 which are provided on the left and right sides of the recess 25, respectively.

The front cover 21 includes fixing holes 27 each into which the cover fixing bolt 23 is inserted from the front side, the fixing holes 27 being provided in one-to-one correspondence with the boss portions 22 of the case 20.

The front cover 21 is fixed to the case 20 by fastening the cover fixing bolts 23 in a state in which the rear edge of the frame-shaped cover peripheral wall portion 21b is fitted to the joining portion 20d of the case 20. Thus, a space R (see FIG. 3) in which the speakers 13, 13, the control unit 14, and the like are disposed is formed inside the core material 15.

Each speaker mounting portion 26 includes a substantially rectangular sound passing portion 26a which is formed in a net shape with a plurality of holes on the front wall 21a, and a plurality of speaker fixing bosses 26b which are disposed con the periphery of the sound passing portion 26a.

Each of the speakers 13, 13 is a plate-shaped speaker which is formed in a rectangular shape longer in an up-down direction than the width direction, and includes a sound output portion 13a on the front surface of the speaker 13, the sound output portion 13a being formed in a rectangular shape long in the up-down direction.

Each of the speakers 13, 13 is disposed so that the front surface thereof faces the corresponding sound passing portion 26a from the inside of the core material 15, and is fixed to the speaker fixing bosses 26b by speaker fixing bolts 28 which are inserted into four corners of the speaker 13 from the rear side, respectively.

The sounds of the speakers 13, 13 are output forward via the sound passing portions 26a, 26a, respectively.

The recess 25 of the front cover 21 is formed so that the center portion of the front wall 21a is recessed rearward into the space R. The recess 25 is disposed between the left and right sound passing portions 26a, 26a.

The recess 25 includes a rear wall portion 25a which forms a bottom portion of the recessed shape, an upper wall portion 25b (upper surface portion) which extends forward from an upper edge of the rear wall portion 25a, a lower wall portion 25c which extends forward from a lower edge of the rear wall portion 25a, and side wall portions 25d, 25d which extend forward from left and right side edges of the rear wall portion 25a, respectively.

The recess 25 is provided so that an opening 29 is formed in a front surface of the front wall 21a to communicate with an internal space of the recess 25 in a front. That is, the recess 25 is formed in the opening 29. The opening 29 of the recess 25 is open toward the headrest seating surface 11a side which is provided in front of the opening 29.

As illustrated in FIG. 3, the recess 25 extends substantially horizontally and in a front-rear direction in a side view. More specifically, the recess 25 is provided in a slightly upward and rearward inclined posture, and the rear wall portion 25a is inclined forward from the vertical direction. The upper wall portion 25b and the lower wall portion 25c is inclined upward and rearward from the peripheral edge of the opening 29 and extend rearward. The opening 29 is provided in the front surface of the front wall 21a to be flush with the front wall 21a, and is inclined forward from the vertical direction.

The recess 25 is tapered so that sizes in the up-down and left-right directions of the internal space are decreased toward the rear side.

The inner surface of the recess 25, specifically, the inner surfaces of the rear wall portion 25a, the upper wall portion 25b, the lower wall portion 25c, and the side wall portions 25d, 25d are provided with a sound absorption member 33 having sound absorption performance higher than that of the material forming the recess 25. The sound absorption member 33 is a non-woven fabric, for example.

The cushion member 16 is provided to cover the periphery of the core material 15 from the front-rear, left-right, and up-down directions. The cushion member 16 is a member for reducing the shock acting on the sound pickup device 1, and is made of urethane, for example.

The cushion member 16 has a cushion opening 30 (opening) through a cushion front portion 16a in the front-rear direction in the cushion front portion 16a which covers the front wall 21a of the front cover 21 from the front side.

The cushion opening 30 is formed in a position overlapping the opening 29 of the recess 25 when seen from the front, and the internal space of the recess 25 is continuous to the cushion opening 30.

The skin 17 is provided around the cushion member 16 so as to cover the cushion member 16 from the front-rear, left-right, and up-down directions. The skin 17 is formed to have a thickness thinner than that of the cushion member 16.

The skin 17 has a skin front portion 17a which covers the cushion front portion 16a from the front side, and a center portion of the skin front portion 17a covers the cushion opening 30 of the cushion member 16 from the front side. That is, the cushion opening 30 is covered by the skin front portion 17a so that the cushion opening 30 and the recess 25 are invisible from the outside of the sound pickup device 1.

The cushion opening 30 connects the recess 25 and the rear surface side of the skin front portion 17a.

The microphone array 12 includes a first sound pickup means 31 and a second sound pickup means 32 which are disposed at positions different from each other in the front-rear direction in the recess 25. Each of the first sound pickup means 31 and the second sound pickup means 32 is a microphone which picks up the sound being propagated through air. Each of the first sound pickup means 31 and the second sound pickup means 32 is a nondirectional microphone.

Specifically, as illustrated in FIG. 3, the first sound pickup means 31 and the second sound pickup means 32 are disposed to extend downwardly from the upper wall portion 25b in the recess 25, and each of the first sound pickup means 31 and the second sound pickup means 32 includes, at a lower end thereof, a detecting unit which detects the sound. The first sound pickup means 31 and the second sound pickup means 32 are the same microphone, and have the same protrusion amount.

The first sound pickup means 31 is disposed at a position closer to the opening 29 in the upper wall portion 25b. The second sound pickup means 32 is disposed behind the first sound pickup means 31 in the upper wall portion 25b. That is, the first sound pickup means 31 and the second sound pickup means 32 are disposed so that a distance L1 and a distance L2 are different from each other, the distance L1 being a distance between the first sound pickup means 31 and a portion, closest to the headrest seating surface 11a, of the opening 29, and the distance L2 being a distance between the second sound pickup means and the portion closest to the headrest seating surface 11a of the opening 29.

The first sound pickup means 31 and the second sound pickup means 32 are disposed at the center portion in the width direction in the recess 25, and are located at the same position in the width direction (left-right direction). That is, when the first sound pickup means 31 and the second sound pickup means 32 are projected onto a plane being formed by the opening 29, the first sound pickup means 31 and the second sound pickup means 32 are disposed to overlap each other.

The microphone array 12 and the control unit 14 comprise beam former forming directivity (selectivity related to direction) of the sound pickup by a beamforming process known in the signal processing techniques.

In the beamforming process, the sensitivity of the pickup of the sound arriving from a directional axis is emphasized by a difference (phase difference) in arrival time of the sound arriving at a plurality of sound pickup means from a sound source, the plurality of sound pickup means being aligned in the directional axis.

The microphone array 12 in which the first sound pickup means 31 and the second sound pickup means 32 are aligned in the front-rear direction has a directional axis which extends toward the forward seated person side. Thus, the microphone array 12 can selectively pick up the sound arriving from the seated person side. Note that the microphone array 12 may include at least two or more sound pickup means which are aligned in the front-rear direction, and may also include the other sound pickup means which is disposed behind the second sound pickup means 32, for example.

The sound of the speech of the seated person which is output toward the front and reflected rearward, and the sound which is output toward the rear from the head H side of the seated person by the speech of the seated person pass through the skin front portion 17a, pass through the cushion opening 30, and are picked up by the first sound pickup means 31 and the second sound pickup means 32 in the recess 25, as indicated by an arrow S in FIG. 3.

Thus, the first sound pickup means 31 and the second sound pickup means 32 are provided in the recess 25, thereby capable of preventing the first sound pickup means 31 and the second sound pickup means 32 from picking up the sound arriving at the sound pickup device 1 from the rear side, the left and right sides, and the up-down direction of the sound pickup device 1. Therefore, the microphone array 12 can satisfactorily pick up the sound from the seated person by blocking the sound arriving from other than the seated person side in front of the sound pickup device 1.

The sound from the seated person passes through the cushion opening 30, thereby capable of preventing the sound from the seated person from being damped by the cushion member 16, so that the microphone array 12 can satisfactorily pick up the sound from the seated person. The cushion opening 30 is covered by the skin front portion 17a, thereby capable of satisfactorily picking up the sound while ensuring the appearance. The skin front portion 17a is thinner than the cushion member 16, thereby capable of preventing the sound arriving at the microphone array 12 from the seated person side from being damped.

The microphone array 12 is disposed behind the front surfaces of the speakers 13, 13. Thus, the sound from the speakers 13, 13 can be prevented from being picked up by the microphone array 12.

The sound absorption member 33 is provided on the recess 25, thereby capable of preventing the sound from being reflected in the recess 25, so that the microphone array 12 can pick up the sound arriving directly from the seated person. Thus, the sound from the seated person can be satisfactorily picked up by the microphone array 12.

The shape and size of the opening 29 are set so that a test sphere T (head form) imitating the head which is used in a safety test of the headrest does not come into contact with the microphone array 12 when the sphere T is brought into contact with the opening 29. Thus, the safety requirements can be satisfied, and the sound from the seated person can be satisfactorily picked up by the microphone array 12. Here, a diameter of the sphere T is 160 (mm).

A peripheral edge portion 29a of the opening 29 is formed to have a curvature radius which is equal or larger than a predetermined value, and no sharpened edge exists in the peripheral edge portion 29a.

As described above, according to the first embodiment to which the present invention is applied, the sound pickup device 1 includes the headrest 11 which is provided with the opening 29 on the headrest seating surface 11a side and has the recess 25 formed in the opening 29, and two or more sound pickup means, the first sound pickup means 31 and the second sound pickup means 32 are disposed in the recess 25 of the headrest 11, and the first sound pickup means 31 and the second sound pickup means 32 are disposed in the recess 25 of the headrest 11 are disposed so that positions of the first sound pickup means 31 and the second sound pickup means 32 are different from each other in the front-rear direction, that is, the distance L1 and the distance L2 are different from each other, the distance L1 and the distance L2 each being a distance from the portion, closest to the headrest seating surface 11a, of the opening 29. Thus, the first sound pickup means 31 and the second sound pickup means 32 are disposed at distances from the sound source, respectively, the distances being different from each other in a direction toward the headrest seating surface 11a from the seated person as the sound source, so that the first sound pickup means 31 and the second sound pickup means 32 can detect the sound from the sound source with a phase difference between the sound arriving at the first sound pickup means 31 and the sound arriving at the second sound pickup means 32. Therefore, the sensitivity of the sound pickup means with respect to the sound from the seated person side can be emphasized by the directivity control (beamforming process) of the sound using the phase difference, thereby capable of satisfactorily picking up the sound from the seated person side. Furthermore, the first pickup means 31 and the second sound pickup means 32 are disposed in the recess 25, thereby capable of preventing the sound arriving from a direction different from that of the seated person side from arriving at the first pickup means 31 and the second sound pickup means 32, and satisfactorily picking up the sound from the seated person side.

The sensitivity of the first pickup means 31 and the second sound pickup means 32 with respect to the sound from the seated person side can be emphasized by the directivity control of the sound using the phase difference, thereby capable of satisfactorily picking up the sound from the seated person side even if the nondirectional microphone is used.

The first pickup means 31 and the second sound pickup means 32 are disposed facing downward from the upper wall portion 25b of the recess 25, thereby capable of preventing dust and the like from being applied on the first sound pickup means 31 and the second sound pickup means 32.

The headrest 11 includes the core material 15, the cushion member 16 which covers the core material 15, and the skin 17 which covers the cushion member 16, the recess 25 is formed in the core material 15, and the cushion member 16 is provided with the cushion opening 30 which communicates the recess 25 with a rear surface side of the skin 17. Thus, the sound having entered the recess 25 through the cushion opening 30 can be picked up by the first sound pickup means 31 and the second sound pickup means 32, thereby capable of satisfactorily picking up the sound from the seated person side even if the cushion member 16 is provided. The cushion opening 30 and the recess 25 can be covered by the skin 17, thereby capable of providing excellent appearance.

FIG. 6 is a cross-sectional view illustrating an example of arrangement variations of the first sound pickup means 31 and the second sound pickup means 32. Here, FIG. 6 illustrates an enlarged portion of the recess 25 in FIG. 3.

Figure 6A:
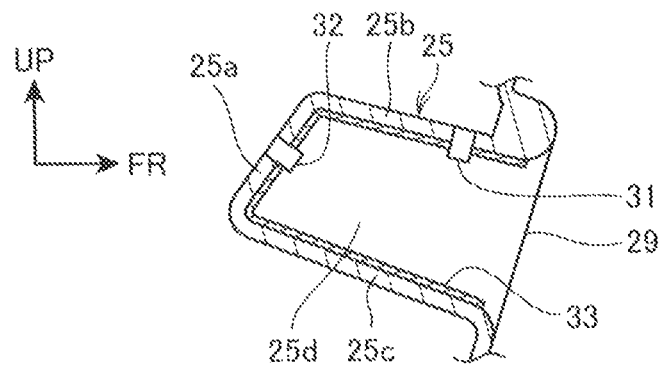
FIG. 6 is a cross-sectional view illustrating an example of arrangement variations of a first sound pickup means and a second sound pickup means.

As illustrated in FIG. 6(A), a configuration may be adopted in which the first sound pickup means 31 is provided on the upper wall portion 25b, and the second sound pickup means 32 is provided behind the first sound pickup means 31 and on the rear wall portion 25a.

Figure 6B:
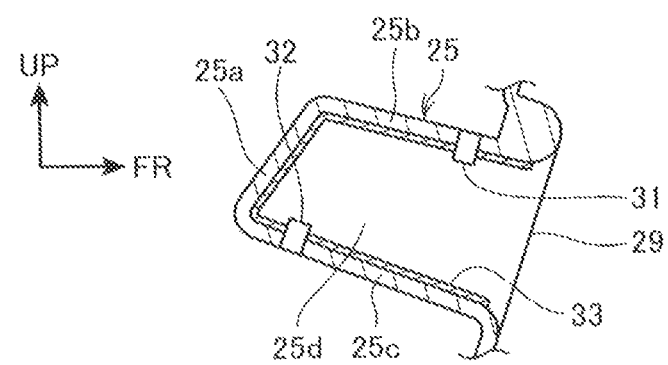

As illustrated in FIG. 6(B), a configuration may be adopted in which the first sound pickup means 31 is provided on the upper wall portion 25b, and the second sound pickup means 32 is provided behind the first sound pickup means 31 and on the lower wall portion 25c.

Figure 6C:
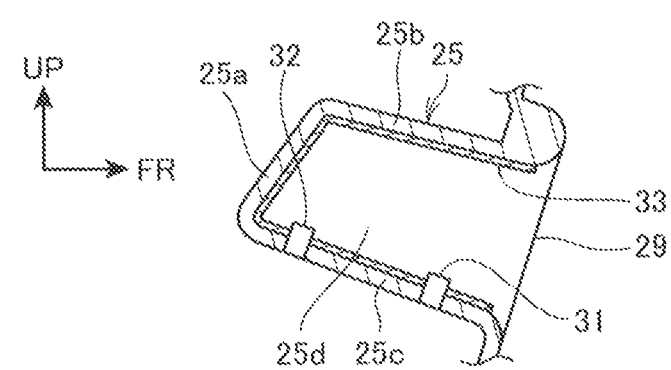

As illustrated in FIG. 6(C), a configuration may be adopted in which the first sound pickup means 31 is provided on the lower wall portion 25c, and the second sound pickup means 32 is provided behind the first sound pickup means 31 and on the lower wall portion 25c.

Figure 6D:
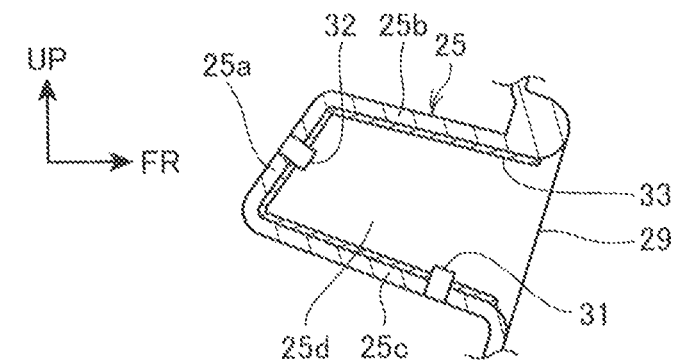

As illustrated in FIG. 6(D), a configuration may be adopted in which the first sound pickup means 31 is provided on the lower wall portion 25c, and the second sound pickup means 32 is provided behind the first sound pickup means 31 and on the rear wall portion 25a.

FIG. 7 is a cross-sectional view illustrating an example of arrangement variations in the width direction of the first sound pickup means 31 and the second sound pickup means 32. FIG. 7 is a cross-sectional view of the recess 25 viewed from above.

In the configurations of FIG. 3, and FIGS. 6(A) to 6(D), the first sound pickup means 31 and the second sound pickup means 32 are provided at the same positions in the width direction (left-right direction) in the recess 25, as illustrated in FIG. 7(A).

In the configurations of FIG. 3, and FIGS. 6(A) to 6(D), the first sound pickup means 31 and the second sound pickup means 32 may be disposed at positions different from each other in the width direction (left-right direction) in the recess 25, as illustrated in FIG. 7(B). That is, when the first sound pickup means 31 and the second sound pickup means 32 are projected onto a plane being formed by the opening 29, the projections of the first sound pickup means 31 and the second sound pickup means 32 may be disposed to be located at positions different from each other. This configuration enables a distance between the first sound pickup means 31 and the second sound pickup means 32 to be easily secured, thereby hardly receiving the restriction on the arrangement space, and capable of increasing the degree of freedom in arrangement of the first sound pickup means 31 and the second sound pickup means 32.

In addition, at least one of the first sound pickup means 31 and the second sound pickup means 32 may be provided on the side wall portion 25d.

Second Embodiment

Hereinafter, a second embodiment to which the present invention is applied will be described with reference to FIG. 8 and FIG. 9. In the second embodiment, portions configured the same as the portions in the above-described first embodiment are denoted by the same reference numerals and signs, and the description of the portions is omitted.

The second embodiment is different from the first embodiment in that a recess 125 is provided in a lower end of the headrest 11.

Figure 8:
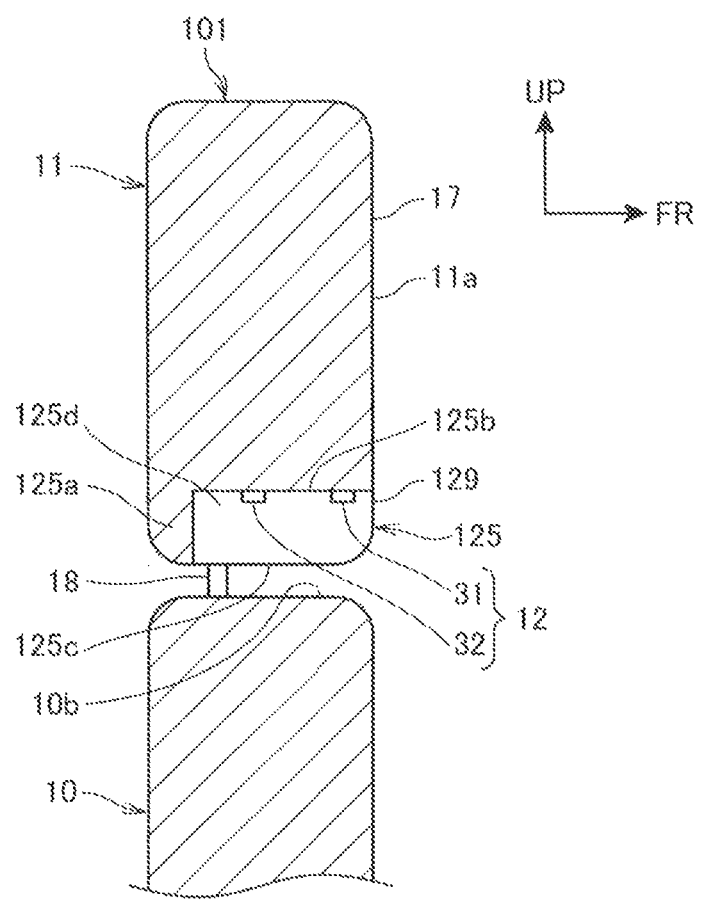
FIG. 8 is a cross-sectional view of a sound pickup device in a second embodiment.

FIG. 8 is a cross-sectional view of a sound pickup device 101 in the second embodiment.

A seat 105 includes the sound pickup device 101, a seat back 10, and a seating portion.

The sound pickup device 101 includes the recess 125 which is open forward and downward, in the lower end of the headrest 11, instead of the recess 25 in the above-described first embodiment.

The recess 125 includes a rear wall portion 125a, an upper wall portion 125b (upper surface portion), a lower surface opening 125c which is open downward, and left and right side wall portions 125d, 125d.

The recess 125 is provided so that an opening 129 is formed in a lower portion of the front surface of the sound pickup device 101, the opening 129 communicating with the internal space of the recess 125 in a front. That is, the recess 125 is formed in the opening 129. The opening 129 of the recess 125 is open toward the headrest seating surface 11a side.

The microphone array 12 is provided in the recess 125. More specifically, the first sound pickup means 31 and the second sound pickup means 32 are provided on the upper wall portion 125b so as to be aligned at positions different from each other in the front-rear direction.

Note that the recess 125 may be provided through a cushion member of the headrest 11 and covered by the skin 17 which is configured to cover the cushion member.

The sound pickup device 101 is mounted on the upper end of the seat back 10 through the headrest stays 18, 18. The lower surface opening 125c of the recess 125 is covered and blocked by the upper surface 10b of the seat back 10 from below.

Thus, the first sound pickup means 31 and the second sound pickup means 32 are provided in the recess 125, thereby capable of preventing the first sound pickup means 31 and the second sound pickup means 32 from picking up the sound arriving at the sound pickup device 101 from the rear side, the left and right sides, and the up-down direction of the sound pickup device 101. Furthermore, the lower surface opening 125c is covered by the upper surface of the seat back 10, thereby capable of preventing the first sound pickup means 31 and the second sound pickup means 32 from picking up the sound arriving at the sound pickup device 101 from below. Therefore, the microphone array 12 can satisfactorily pick up the sound from the seated person by blocking the sound arriving from other than the seated person side in front of the sound pickup device 101.

Figure 9:
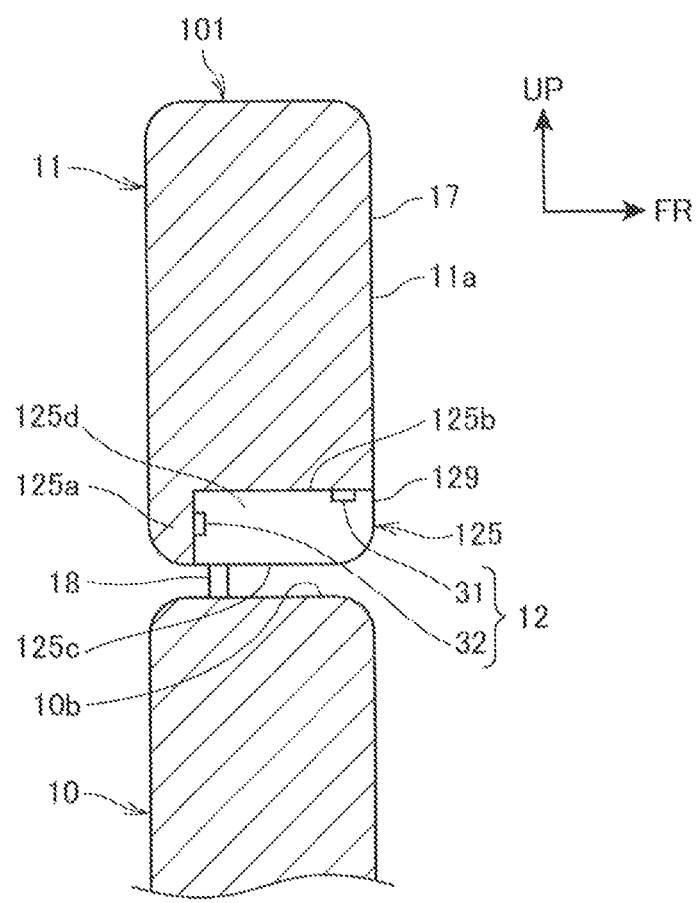
FIG. 9 is a cross-sectional view illustrating an example of arrangement variations of a first sound pickup means and a second sound pickup means in the second embodiment.

FIG. 9 is a cross-sectional view illustrating an example of arrangement variations of the first sound pickup means 31 and the second sound pickup means 32 in the second embodiment.

As illustrated in FIG. 9, the second sound pickup means 32 disposed behind the first sound pickup means 31 may be disposed on the rear wall portion 125a.

In addition, at least one of the first sound pickup means 31 and the second sound pickup means 32 may be provided on the side wall portion 125d.

Third Embodiment

Hereinafter, a third embodiment to which the present invention is applied will be described with reference to FIG. 10 and FIG. 11. In the third embodiment, portions configured the same as the portions in the above-described first embodiment are denoted by the same reference numerals and signs, and the description of the portions is omitted.

The third embodiment is different from the first embodiment in that a recess 225 and a microphone array 12 are provided in a seat back 210, and the like.

Figure 10:
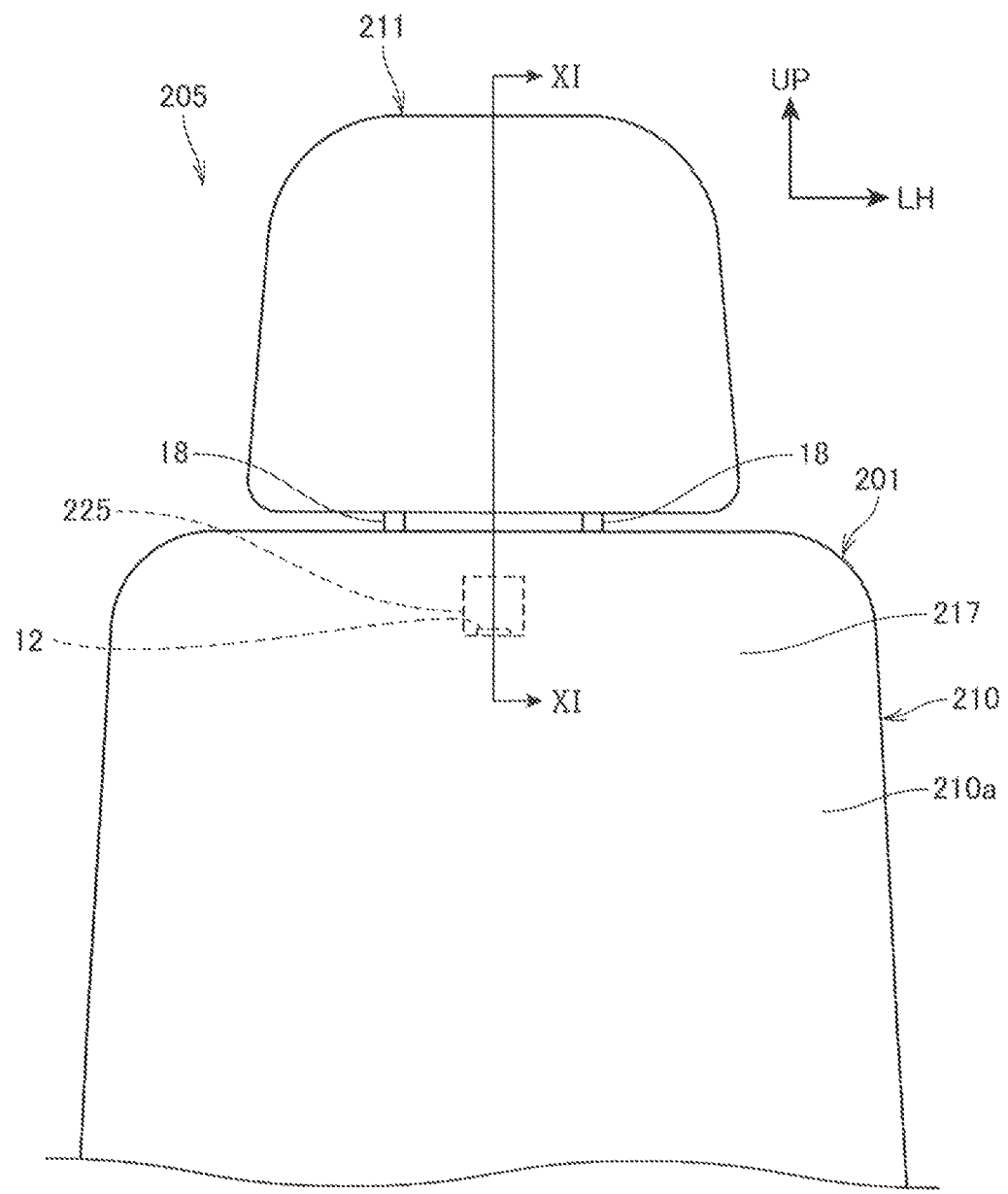
FIG. 10 is a front view of a sound pickup device in a third embodiment.
Figure 11:
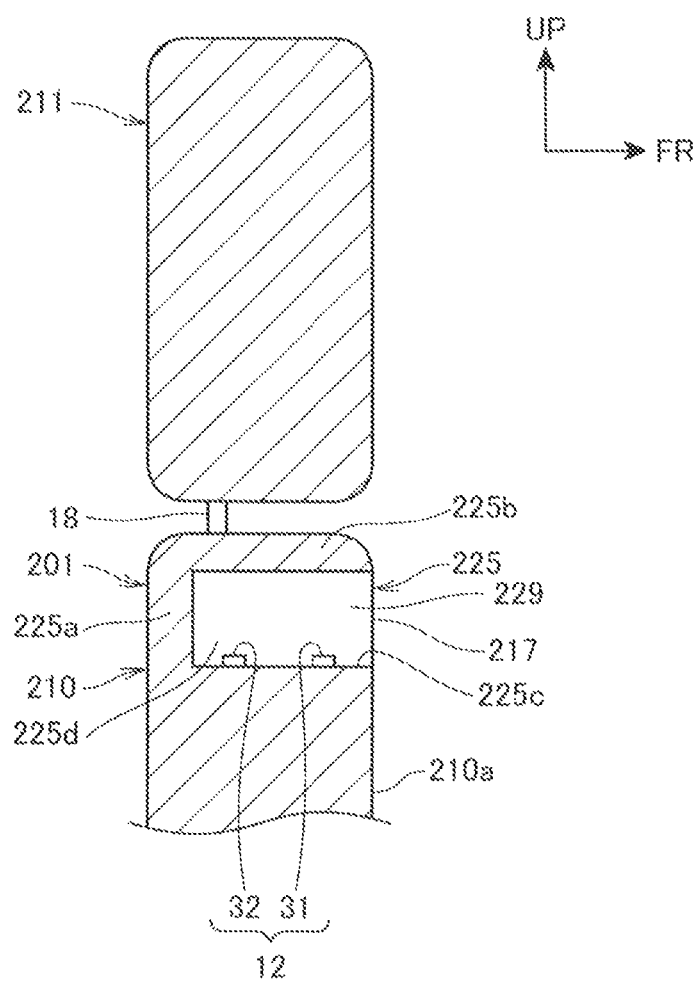
FIG. 11 is a cross-sectional view taken along line XI-XI of FIG. 10.

FIG. 10 is a front view of a sound pickup device 201 in the third embodiment. FIG. 11 is a cross-sectional view taken along line XI-XI of FIG. 10.

A seat 205 includes the sound pickup device 201, a headrest 211, and a seating portion.

The sound pickup device 201 includes a seat back 210 which serves as a backrest, and a microphone array 12 which serves as a sound pickup means.

The headrest 211 is mounted on the upper end of the seat back 210 through the headrest stays 18, 18.

The seat back 210 includes a seat back seating surface 210a which faces the back of the seated person and against which the back of the seated person can be leaned. The seat back seating surface 210a is a front surface of the seat back 210.

The seat back 210 includes the recess 225 which is recessed rearward at the center portion in the width direction of the seat back 210, in the upper portion close to the head of the seated person. The recess 225 includes a rear wall portion 225a, an upper wall portion 225b, a lower wall portion 225c, and left and right side wall portions 225d, 225d.

The recess 225 is provided so that an opening 229 is formed in a front surface of the seat back 210 to communicate with an internal space of the recess 225 in a front. That is, the recess 225 is formed in the opening 229. The opening 229 is open toward the seat back seating surface 210a side which is provided in front of the opening 229.

The recess 225 is open forward through the cushion member of the seat back 210, and the opening 229 of the recess 225 is covered by a seat back skin 217 which is configured to cover the above-described cushion member.

The microphone array 12 is provided in the recess 225. More specifically, the first sound pickup means 31 and the second sound pickup means 32 are provided on the lower wall portion 225c so as to be aligned at positions different from each other in the front-rear direction.

The sound from the seated person side arrives at the microphone array 12 by passing through the seat back skin 217.

In the third embodiment, the sound pickup device 201 includes the seat back 210 which is provided with the opening 229 on the seat back seating surface 210a side and has the recess 225 formed in the opening 229, and two or more sound pickup means, the first sound pickup means 31 and the second sound pickup means 32 are disposed in the recess 225, and the first sound pickup means 31 and the second sound pickup means 32 are disposed so that the positions of the first sound pickup means 31 and the second sound pickup means 32 are different from each other in the front-rear direction, that is, distances to the first sound pickup means 31 and the second sound pickup means 32 from a portion, closest to the seat back seating surface 210a, of the opening 229 are different from each other. Thus, the first sound pickup means 31 and the second sound pickup means 32 are disposed at distances from the sound source, respectively, the distances being different from each other in a direction toward the seat back seating surface 210a from the seated person as the sound source, so that the first sound pickup means 31 and the second sound pickup means 32 can detect the sound from the sound source with a phase difference between the sound arriving at the first sound pickup means 31 and the sound arriving at the second sound pickup means 32. Therefore, the sensitivity of the sound pickup means with respect to the sound from the seated person side can be emphasized by the directivity control of the sound using the phase difference, thereby capable of satisfactorily picking up the sound from the seated person side. Furthermore, the first pickup means 31 and the second sound pickup means 32 are disposed in the recess 225, thereby capable of preventing the sound arriving from a direction different from that of the seated person side from arriving at the first pickup means 31 and the second sound pickup means 32, and satisfactorily picking up the sound from the seated person side.

Note that it is sufficient that the first pickup means 31 and the second sound pickup means 32 are disposed in the recess 225 at the positions different from each other in the front-rear direction, respectively, and as illustrated in FIG. 6 and FIG. 7, the attaching positions of the first pickup means 31 and the second sound pickup means 32 may be arbitrarily changed.

Fourth Embodiment

Hereinafter, a fourth embodiment to which the present invention is applied will be described with reference to FIG. 12. In the fourth embodiment, portions configured the same as the portions in the above-described first embodiment are denoted by the same reference numerals and signs, and the description of the portions is omitted.

The fourth embodiment is different from the first embodiment in that a recess 325 and a microphone array 12 are provided on an upper end of a seat back 310, and the like.

Figure 12:
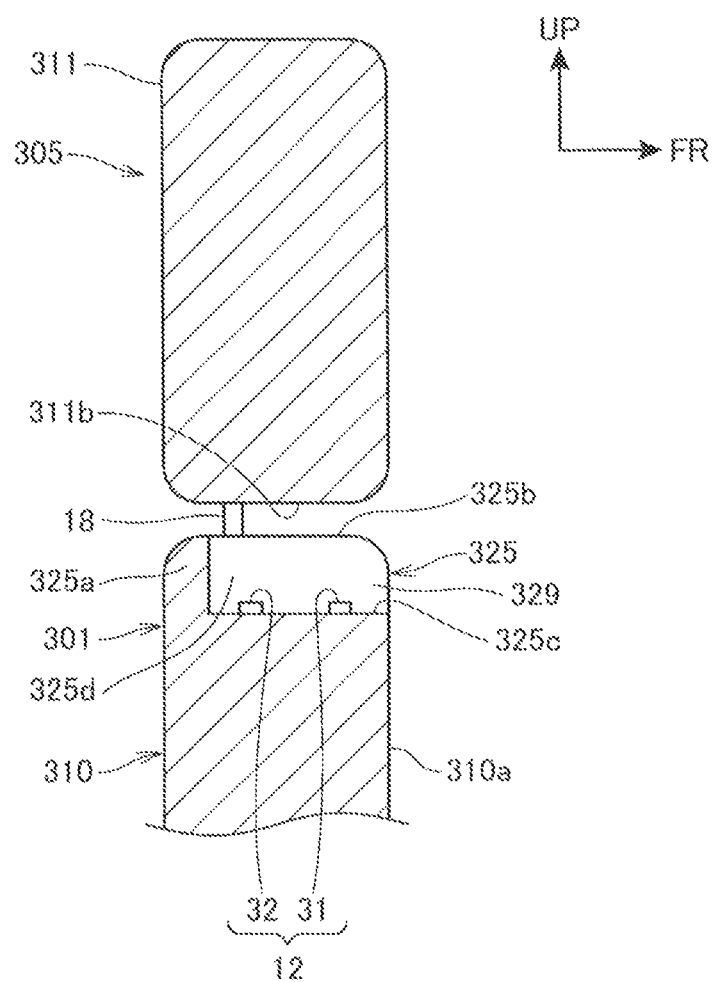
FIG. 12 is a cross-sectional view of a sound pickup device in a fourth embodiment

FIG. 12 is a cross-sectional view of a sound pickup device 301 in the fourth embodiment. FIG. 12 is a diagram in which the cross-sectional view taken along line XI-XI of FIG. 10 is applied to the fourth embodiment.

A seat 305 includes the sound pickup device 301, a headrest 311, and a seating portion.

The sound pickup device 301 includes a seat back 310 which serves as a backrest, and a microphone array 12 which serves as a sound pickup means.

The seat back 310 includes a seat back seating surface 310*a* which faces the back of the seated person and against which the back of the seated person can be leaned. The seat back seating surface 310*a* is a front surface of the seat back 310.

The seat back 310 includes the recess 325 which is recessed rearward at the center portion in the width direction of the seat back 310, in the upper portion close to the head of the seated person. The recess 325 is open upward and forward.

The recess 325 includes a rear wall portion 325*a*, an upper surface opening 325*b* which is open upward, a lower wall portion 325*c*, and left and right side wall portions 325*d*, 325*d*.

The recess 325 is provided so that an opening 329 is formed in a front surface of the seat back 310 to communicate with an internal space of the recess 325 in a front. That is, the recess 325 is formed in the opening 329. The opening 329 is open toward the seat back seating surface 310*a* side which is provided in front of the opening 329.

Note that the recess 325 may be provided through a cushion member of the seat back 310 and covered by the skin which is configured to cover the cushion member.

The microphone array 12 is provided in the recess 325. More specifically, the first sound pickup means 31 and the second sound pickup means 32 are provided on the lower wall portion 325*c* so as to be aligned at positions different from each other in the front-rear direction.

The headrest 311 is mounted on the upper end of the seat back 310 through the headrest stays 18, 18. The upper surface opening 325*b* of the recess 325 is covered and blocked by a lower surface 311*b* of the headrest 311 from above.

Thus, the first sound pickup means 31 and the second sound pickup means 32 are provided in the recess 325, thereby capable of preventing the first sound pickup means 31 and the second sound pickup means 32 from picking up the sound arriving at the sound pickup device 301 from the rear side, the left and right sides, and the up-down direction of the sound pickup device 301. Furthermore, the upper surface opening 325*b* is covered by the lower surface 311*b* of the headrest 311, thereby capable of preventing the first sound pickup means 31 and the second sound pickup means 32 from picking up the sound arriving at the sound pickup device 301 from above. Therefore, the microphone array 12 can satisfactorily pick up the sound from the seated person by blocking the sound arriving from other than the seated person side in front of the sound pickup device 301.

Note that the second sound pickup means 32 disposed behind the first sound pickup means 31 may be disposed on the rear wall portion 325*a*. In addition, at least one of the first sound pickup means 31 and the second sound pickup means 32 may be provided on the side wall portion 325*d*.

Fifth Embodiment

Hereinafter, a fifth embodiment to which the present invention is applied will be described with reference to FIG. 13 and FIG. 14. In the fifth embodiment, portions configured the same as the portions in the above-described first embodiment are denoted by the same reference numerals and signs, and the description of the portions is omitted.

The fifth embodiment is different from the first embodiment in that the microphone array 12 is provided in a recess 425 which is provided between a headrest 411 and a seat back 410, and the like.

Figure 13:
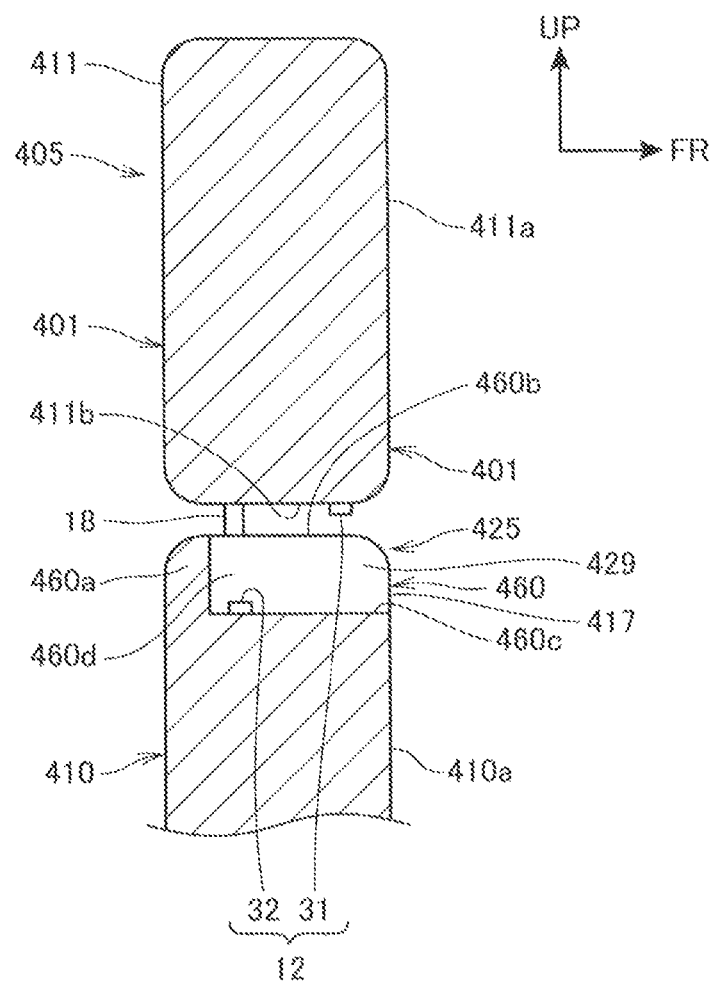
FIG. 13 is a cross-sectional view of a sound pickup device in a fifth embodiment.

FIG. 13 is a cross-sectional view of a sound pickup device 401 in the fifth embodiment. FIG. 13 is a diagram in which the cross-sectional view taken along line XI-XI of FIG. 10 is applied to the fifth embodiment.

A seat 405 includes the sound pickup device 401, and a seating portion (not illustrated) in which the seated person is seated.

The sound pickup device 401 includes a seat back 410 (one of the seat back and the headrest) which serves as a backrest extending upwardly from a rear end of the seating portion, the headrest 411 (the other of the seat back and the headrest) and a microphone array 12 which serves as a sound pickup means.

The headrest 411 is mounted on the upper end of the seat back 410 through the headrest stays 18, 18.

The headrest 411 includes, in the front surface, a headrest seating surface 411*a* which faces the back of the head of the seated person.

The seat back 410 includes, in the front surface, a seat back seating surface 410*a* which faces the back of the seated person and against which the back of the seated person can be leaned.

The recess 425 which is recessed rearward is provided between a lower end of the headrest 411 and an upper end of the seat back 410. The recess 425 is provided at the center portion in the width direction of the seat back 410.

More specifically, the recess 425 is formed by a recess 460 on the seat back side (recess on one side) which is provided at the upper end of the seat back 410, and a lower surface 411*b* of the headrest 411.

The recess 460 on the seat back side is open upward and forward. The recess 460 on the seat back side includes a rear wall portion 460*a*, an upper surface opening 460*b* which is open upward, a lower wall portion 460*c*, and left and right side wall portions 460*d*, 460*d*.

The upper surface opening 460*b* of the recess 460 on the seat back side is covered and blocked by a lower surface 411*b* of the headrest 411 from above. The lower surface 411*b* serves as an upper surface portion of the recess 425.

The recess 425 is provided in an upper portion of the seat 405 so that an opening 429 is formed in a front surface of the seat 405 to communicate with an internal space of the recess 425 in a front. That is, the recess 425 is formed in the opening 429. The opening 429 is open toward the seat back seating surface 410a side which is provided in front of the opening 429.

The recess 425 is open forward through the cushion member of the seat back 410, and the opening 429 of the recess 425 is covered by a seat back skin 417 which is configured to cover the above-described cushion member.

The microphone array 12 is provided in the recess 425. More specifically, the first sound pickup means 31 is provided on a lower surface 411b of the headrest 411 near the opening 429. The first sound pickup means 31 extends downward from the lower surface 411b toward the lower wall portion 460c side.

The second sound pickup means 32 is provided behind the first sound pickup means 31 and on the lower wall portion 460c.

That is, the first sound pickup means 31 and the second sound pickup means 32 are provided in the recess 425 so as to be aligned at positions different from each other in the front-rear direction.

The sound from the seated person side arrives at the microphone array 12 by passing through the seat back skin 417.

According to the fifth embodiment, the sound pickup device 401 includes the seat back 410, and the headrest 411 which is connected to the seat back 410, the recess 425 provided with an opening 429 on the seat back seating surface 410a is formed between the seat back 410 and the headrest 411, the recess 425 is formed by joining the recess 460 on the seat back side which is formed in the seat back 410 being one of the seat back 410 and the headrest 411 and the headrest 411 which is the other of the seat back 410 and the headrest 411, and the sound pickup device 401 further includes two or more sound pickup means, the first sound pickup means 31 and the second sound pickup means 32 are disposed in the recess 425, and the first sound pickup means 31 and the second sound pickup means 32 are disposed so that the positions of the first sound pickup means 31 and the second sound pickup means 32 are different from each other in the front-rear direction, that is, distances to the first sound pickup means 31 and the second sound pickup means 32 from a portion, closest to the seat back seating surface 410a, of the opening 429 are different from each other.

Thus, the first sound pickup means 31 and the second sound pickup means 32 are disposed at distances from the sound source, respectively, the distances being different from each other in a direction toward the seating surface from the seated person as the sound source, so that the first sound pickup means 31 and the second sound pickup means 32 can detect the sound from the sound source with a phase difference between the sound arriving at the first sound pickup means 31 and the sound arriving at the second sound pickup means 32. Therefore, the sensitivity of the sound pickup means with respect to the sound from the seated person side can be emphasized by the directivity control of the sound using the phase difference, thereby capable of satisfactorily picking up the sound from the seated person side. Furthermore, the first pickup means 31 and the second sound pickup means 32 are disposed in the recess 425, thereby capable of preventing the sound arriving from a direction different from that of the seated person side from arriving at the first pickup means 31 and the second sound pickup means 32, and satisfactorily picking up the sound from the seated person side.

The recess 460 on the seat back side includes the upper surface opening 460b, thereby capable of preventing the first sound pickup means 31 from being sandwiched and compressed between the upper surface of the seat back 410 and the headrest 411 even if the first sound pickup means 31 is provided on the lower surface 411b of the headrest 411, and increasing the degree of freedom in arrangement.

Furthermore, the second sound pickup means 32 which is one of the first sound pickup means 31 and the second sound pickup means 32 is provided in the recess 460 on the seat back side, and the first sound pickup means 31 which is the other of the first sound pickup means 31 and the second sound pickup means 32 is provided in the headrest 411. Therefore, the first sound pickup means 31 and the second sound pickup means 32 can be separately disposed in the seat back 410 and the headrest 411, thereby capable of securing a large space for arrangement and increasing the flexibility in layout of the sound pickup means.

Figure 14:
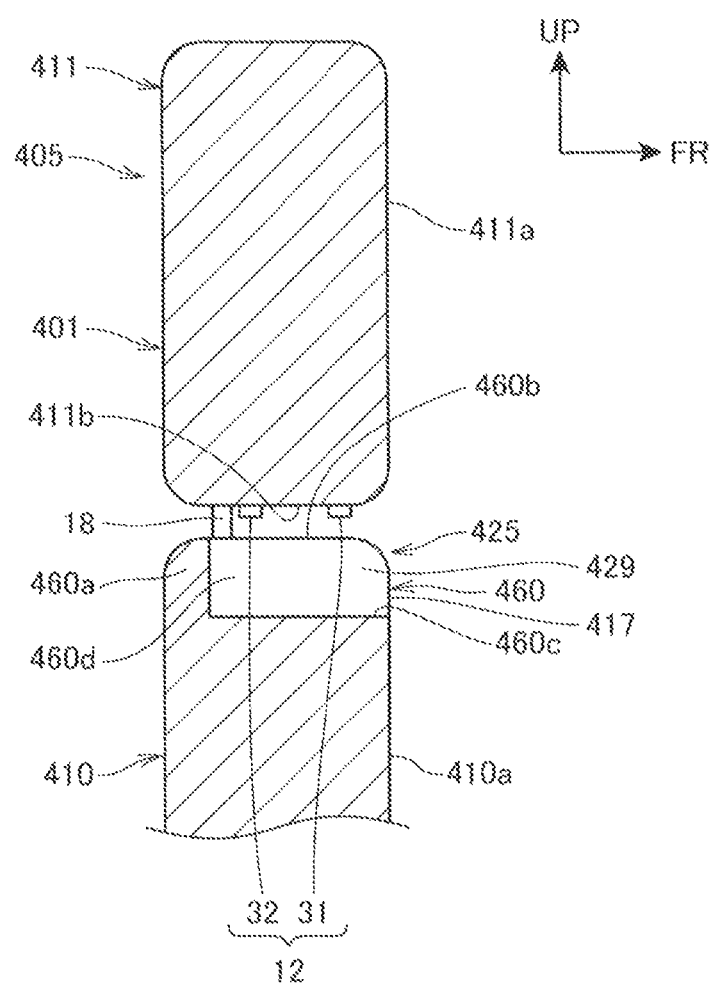
FIG. 14 is a cross-sectional view illustrating an example of arrangement variations of a first sound pickup means and a second sound pickup means in the fifth embodiment.

FIG. 14 is a cross-sectional view illustrating an example of arrangement variations of the first sound pickup means 31 and the second sound pickup means 32 in the fifth embodiment.

As illustrated in FIG. 14, the second sound pickup means 32 which is disposed behind the first sound pickup means 31 may be disposed on the lower surface 411b of the headrest 411, and both of the first sound pickup means 31 and the second sound pickup means 32 may be disposed on the lower surface 411b.

Note that in the above-described fifth embodiment, a configuration in which the recess 460 on the seat back side which is a recess on one side is provided in the seat back 410 is explained as an example, but the present invention is not limited to this, and a recess on one side may be formed on the lower end of the headrest 411. In addition to the recess 460 on the seat back side of the seat back 410, a recess on the other side such as the recess 125 of FIG. 8 may be provided on the lower end of the headrest 411, so that the microphone array 12 is arranged in the recess being formed by the recess on the other side and the recess 460 on the seat back side. That is, the recess is formed by joining the recess on one side which is formed in at least one of the seat back 410 and the headrest 411, and the other of the seat back 410 and the headrest 411.

REFERENCE SIGNS LIST 1, 101, 201, 301, 401 Sound pickup device
11, 411 Headrest
11a Headrest seating surface (seating surface)
15 Core material
16 Cushion member
17 Skin
25, 125, 225, 325, 425 Recess
25b, 125b Upper wall portion (upper surface portion)
29, 129, 229, 329, 429 Opening
30 Cushion opening
31 First sound pickup means
32 Second sound pickup means
210, 310 Seat back
410 Seat back (one of seat back and headrest)
410a Seat back seating surface (seating surface)
411 Headrest (the other of seat back and headrest)
411b Lower surface (upper surface portion)
460 Recess on seat back side (recess on one side)

The invention claimed is:

1. A sound pickup device, comprising:
a headrest which is provided with an opening on a seating surface side, and has a recess formed in the opening extending in a front-rear direction in a side view; and
two or more microphones,
wherein a first microphone and a second microphone are disposed in the recess of the headrest, and
each of the first microphone and the second microphone is a nondirectional microphone, and at least one of the first microphone and the second microphone is disposed in a wall portion, of the recess, extending forward to the opening from a rear wall portion which faces the opening so that distances to the first microphone and the second microphone from a portion, closest to the seating surface, of the opening of the headrest are different from each other.

2. The sound pickup device according to claim 1, wherein at least one of the first microphone and the second microphone is disposed face downward from an upper surface portion of the recess.

3. The sound pickup device according to claim 1, wherein when the first microphone and the second microphone are projected onto a plane being formed by the opening, the projections of the first microphone and the second microphone are disposed to be located at positions different from each other.

4. The sound pickup device according to claim 1, wherein the headrest includes a core material, a cushion member which is configured to cover the core material, a skin which is configured to cover the cushion member, wherein
the recess is formed in the core material, the cushion member is provided with an opening which communicates the recess with a rear surface side of the skin.

5. A sound pickup device, comprising:
a seat back which is provided with an opening on a seating surface side, and has a recess formed in the opening extending in a front-rear direction in a side view; and
two or more sound pickup means microphones,
wherein a first microphone and a second microphone are disposed in the recess of the seat back, and
each of the first microphone and the second microphone is a nondirectional microphone, and the first microphone and the second microphone are disposed in a wall portion, of the recess, extending forward to the opening from a rear wall portion which faces the opening so that distances to the first microphone and the second microphone from a portion, closest to the seating surface, of the opening of the seat back are different from each other.

6. A sound pickup device, comprising:
a seat back; and a headrest which is connected to the seat back,
wherein a recess being provided with an opening on a seating surface side is formed between the seat back and the headrest,
the recess is formed by joining a recess on one side which is formed in one of the seat back and the headrest, and the other of the seat back and the headrest, the opening extending in a front-rear direction in a side view,
the sound pickup device further comprising:
two or more microphones,
wherein a first microphone and a second microphone are disposed in the recess, and
each of the first microphone and the second microphone is a nondirectional microphone, and the first microphone and the second microphone are disposed in a wall portion, of the recess, extending forward to the opening from a rear wall portion which faces with opening so that distances to the first microphone and the second microphone from a portion, closest to the seating surface, of the opening are different from each other.

7. The sound pickup device according to claim 6, wherein one of the first microphone and the second microphone is provided in the recess on one side, and the other of the first microphone and the second microphone is provided in the other of the seat back and the headrest.

* * * * *